Jan. 13, 1959  K. L. KELLER  2,867,909
PRECISION PARALLEL GAUGE
Filed March 23, 1955  2 Sheets-Sheet 1

INVENTOR.
KARL L. KELLER
BY Robert H. Mentag
ATTORNEY

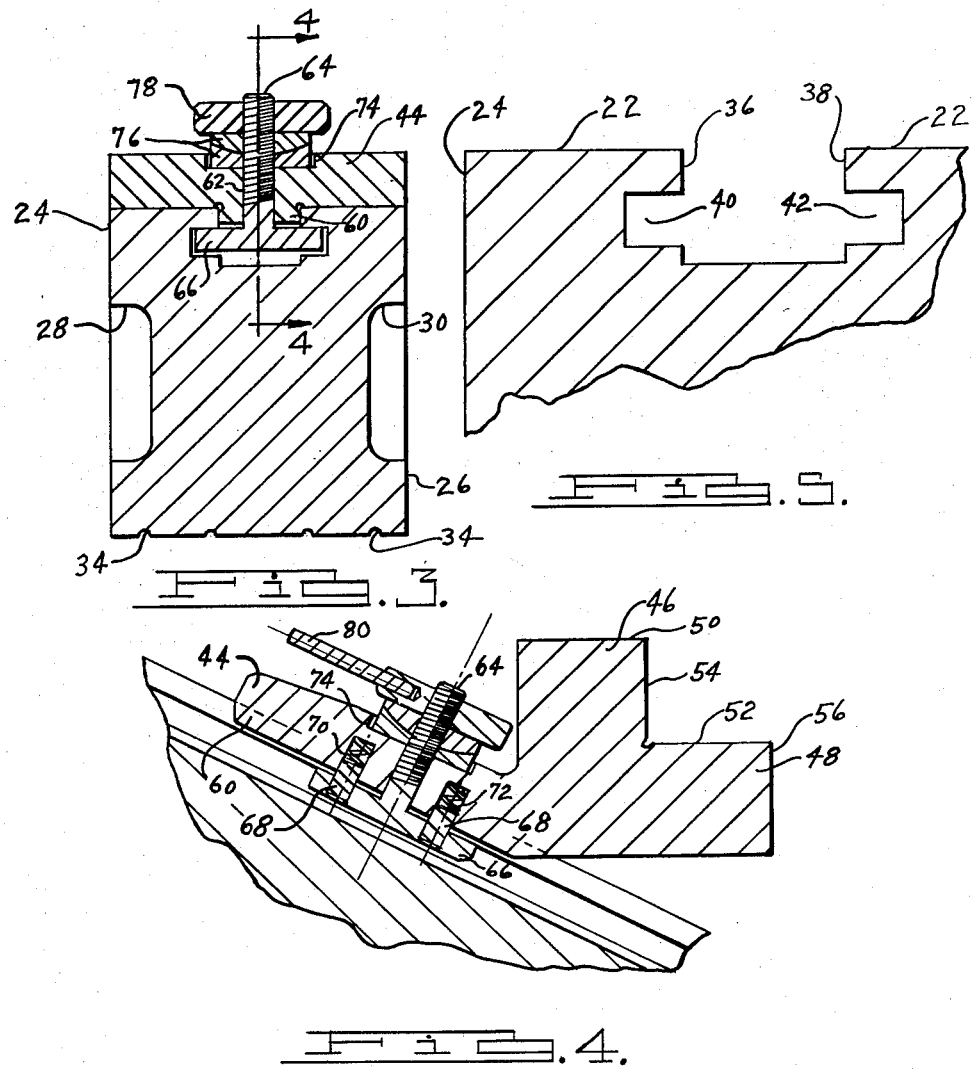

United States Patent Office 2,867,909
Patented Jan. 13, 1959

2,867,909

PRECISION PARALLEL GAUGE

Karl L. Keller, Detroit, Mich.

Application March 23, 1955, Serial No. 496,103

2 Claims. (Cl. 33—162)

This invention relates to a precision parallel gauge which is adapted for use in combination with precision standards for layout and checking work, and for close limit work.

It is an important object of this invention to provide a precision parallel gauge which is provided with an extra large width, which is adapted to provide extra stability to the gauge, whereby the gauge may be placed on and used with a higher buildup of precision standards or hoist blocks than is possible with any similar gauge heretofore known, and yet which may provide precision results from such use.

It is another object to provide a precision parallel gauge which is provided with a base having a plurality of U-shaped longitudinally extended grooves on two sides thereof, which grooves or reliefs are adapted to reduce the normally present friction between the gauge and the surface over which the gauge is moved, and which function to gather up any dust which would otherwise be caught between the gauge base surface and the supporting surface, and, thereby, produce inaccurate results.

It is another object of this invention to provide a precision parallel gauge having a triangularly shaped base on which two of the sides are disposed perpendicular to each other, and which are adapted for slidable engagement with a supporting surface, as desired; said gauge base being provided with a third sloping side which is provided with a longitudinally extending inverted T slot, on which is slidably mounted a slide having a plurality of ground and lapped faces thereon, which slide is releasably locked on said third side by a novel locking means engaged in said T slot.

It is a still further object of this invention to provide a precision parallel gauge having a slide adjustably mounted on a sloping face on the base of the gauge by means of a releasable locking device, comprising, a screw having the head thereof slideably mounted in an inverted T slot in said sloping face, a spring means mounted between said screw head and said slide, said screw extending upwardly from said screw head and passing through an aperture in the rear end of said slide, a pair of swivel washers mounted on the upper end of said screw, and a lock nut provided with a lock pin threadably mounted on the upper end of said screw, whereby said lock nut may be rotated by said lock pin to draw the screw upwardly, and the screw head upwardly into a releasable locking engagement with the inverted T slot in said sloping face.

It is another object of this invention to provide a precision parallel gauge having an adjustable slide thereon, which is made from a suitable tool steel hardened as desired, and which is provided with a plurality of angularly disposed faces which are ground and lapped to provide a plurality of precision surfaces, and which are provided with tapped holes therein, whereby precision tools may be fastened to said faces and the gauge may then be used as a tool for precision shaving purposes and close limit metal scraping work.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 3 is an elevational sectional view of the structure illustrated in Fig. 2, taken along the line 3—3 thereof;

Fig. 4 is a fragmentary elevational sectional view of the structure illustrated in Fig. 3, taken along the line 4—4 thereof; and, Fig. 5 is a fragmentary elevational sectional view of the structure illustrated in Fig. 2, taken along the line 5—5 thereof.

Figures 1, 2:
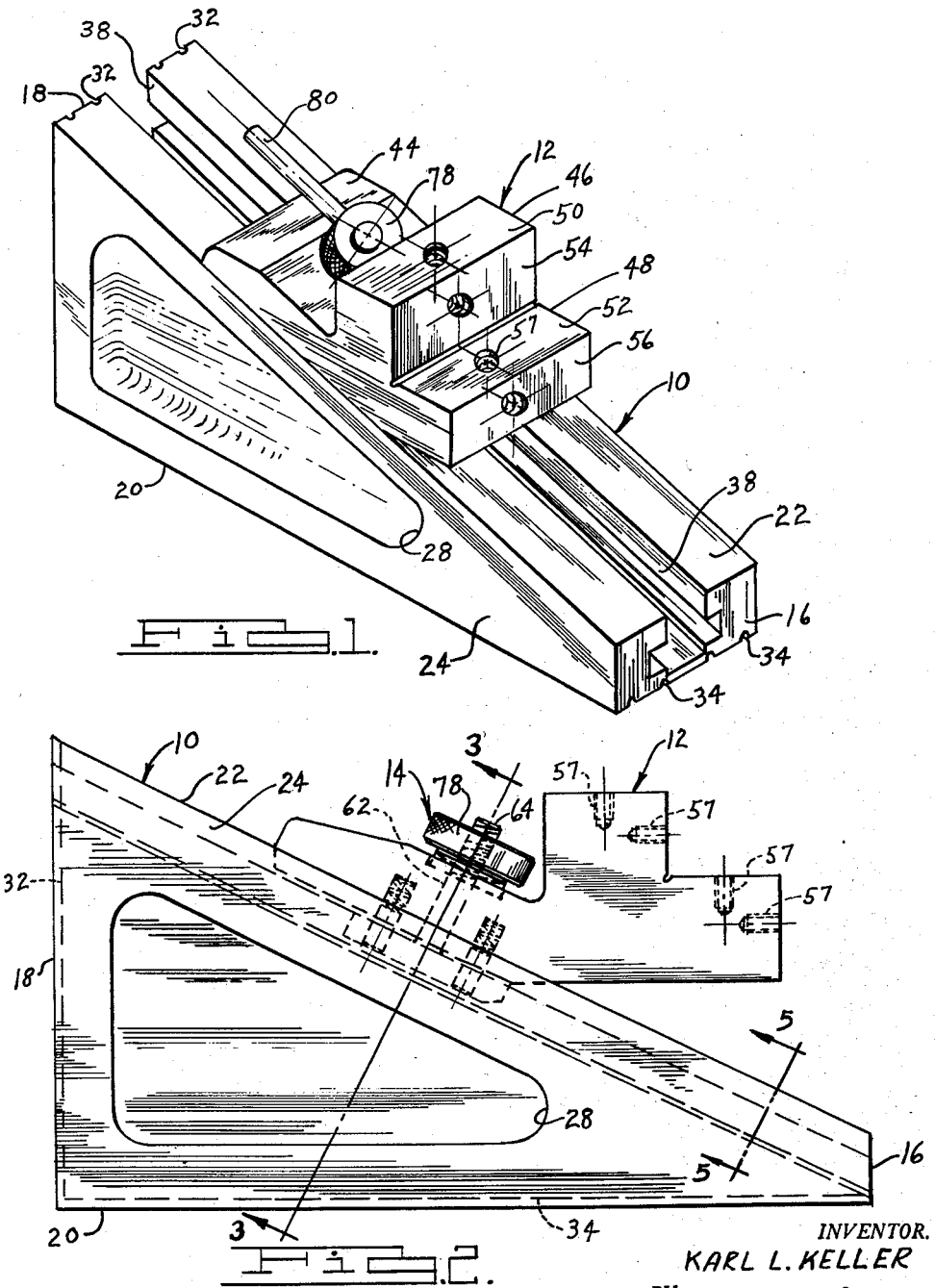
Fig. 1 is a perspective view of an illustrative embodiment of the invention.
Fig. 2 is a side elevational view of the structure illustrated in Fig. 1.

Before explaining the invention in detail, it is to be understood, that the invention is not limited in its application to the details of construction and arrangement of parts illustrated in the accompanying drawings, since the invention is capable of other embodiments and of being practiced or carried out in various ways. Also, it is to be understood, that the phraseology and terminology employed herein is for the purpose of description and not limitation.

Referring now to the drawings, and more particularly, to Figs. 1 and 2, the numeral 10 designates generally the base of the gauge, and the numeral 12 designates a slide which is releasably locked on the base 10, by means of the locking means 14. The gauge base 10 is preferably formed from a solid piece of a suitable metal and is substantially triangular in shape, having a pair of vertical parallel end surfaces 16 and 18, which are joined by a horizontal lower end surface 20. The vertical end surface 18 is longer than the vertical end surface 16, and said vertical end surfaces are joined by a sloping upper surface 22, which slopes downwardly from the upper edge of the end surface 18 to the top of the short end surface 16.

The gauge base 10 is provided with a pair of vertical spaced apart parallel side surfaces 24 and 26, in each of which is formed a recessed area, as 28 and 30, respectively. The recessed areas 28 and 30 are adapted to function as suitable hand gripping areas.

The gauge base surfaces 18, 20 and 22 are ground and lapped to very close limits, to provide the gauge with very accurate surfaces especially adapted for precision work. The gauge base surfaces 18 and 20 are provided with a plurality of spaced apart, longitudinally extending grooves or reliefs, as 32 and 34, respectively, which function to catch up the dust which would otherwise be caught between the gauge and the surface on which it is disposed.

As best seen in Figs. 1 and 5, the gauge base 10 is provided along the upper surface thereof with an inwardly extending longitudinal inverted T slot having the sides 36 and 38, and the inwardly directed portions 40 and 42. The slide 12 is adapted to be slidably mounted on the upper surface 22 of the gauge and is provided with a tail portion as 44, from which extends a vertical leg 46 and a horizontal leg 48. The slide legs 46 and 48 are provided with the horizontal faces 50 and 52, and the vertical faces 54 and 56, respectively, which faces are ground and lapped for precision work. Said slide leg faces are provided with tapped holes, as 57, in which a suitable threaded means may be mounted to hold special tools on said faces for gauging models, patterns and the like, and for shaving certain shapes, as angles and radii.

The slide tail portion 44 is provided with a downwardly extended portion 60 adapted to be slidably mounted in the inverted T slot in the upper face 22 of the gauge base 10. The slide tail portion 44 is also provided with an upwardly directed aperture 62 extending therethrough, which slidably receives the threaded lock screw 64. The lock screw 64 is provided with a suitable enlarged head 66 on the lower end thereof, which is adapted to be slidably mounted in the inwardly directed portions 40 and 42 of the inverted T slot. The screw head is provided with a pair of spaced apart lock guide pins 68 which are suitably fixed in said head, as by being press fitted in suitable apertures in said head. The lock guide pins are adapted to slidably engage in mating apertures as 70 in the downwardly extended portion 60 of the slide tail portion 44. Each of the apertures 70 is provided with a suitable spiral spring as 72 against which the lock guide pins abut.

The gauge slide is provided on the upper surface of the portion 44 with a recess 74 which communicates with the aperture 62, and in which is seated the set of swivel washers 76. The swivel washers 76 are adapted to be seated around the upper end of the lock screw 64 and are held in place in the recess 74 by means of the lock nut 78 which is threadably mounted on the upper end of the lock screw 64. The lock nut 78 is provided with a lock pin 80 which permits the operator of the gauge to adjust the lock nut in an easy and efficient manner.

It will be obvious, that when the lock nut is threaded on the lock screw, the lock screw will be drawn upwardly, thereby moving the screw head into engagement with the upper faces of the inwardly directed portions of the inverted T slot and creating a downward pressure on the gauge slide to hold it releasably locked in position on the upper surface 22 of the gauge base 10. The slide may be easily moved to any desired position on the base by merely loosening the lock nut and sliding the gauge slide to the desired position and then locking the slide in such position by means of the lock nut.

It will be seen, that I have provided a novel and improved precision parallel gauge which is extra wide to give the gauge extra stability not found in the similar gauges heretofore known in the prior art. By making the gauge solid, the weight of the gauge is increased, and this factor is an advantage in that it helps to prevent the gauge from tilting and swaying. All the faces of the base and slide are ground and lapped, as well as the faces 36 and 38 of the inverted T slot, and the upper faces of the inwardly directed T slot portions 40 and 42, to provide a gauge which is especially adapted for close limit work.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A precision parallel gauge of the class described, comprising: a base member made from a single solid piece of material; said base member having a horizontal bottom surface and two vertical end surfaces perpendicular to said bottom surface; one of said end surfaces being longer than the other end surface; a downwardly sloping upper surface connecting said end surfaces; said upper sloping surface being provided with an inverted T-slot; a slide movably mounted on said upper sloping surface; said slide including a tail portion adapted to slidably engage the upper sloping surface and being provided with a downwardly extended portion which is adapted to extend into the leg of said T-slot; said slide further including an integral horizontal leg extending outwardly from the lower end of said tail portion in the vertical plane of the base member and being parallel to the horizontal bottom surface and perpendicular to the end surfaces of the base member, and an integral vertical leg extending outwardly from the lower end of said tail portion in the vertical plane of the base member and being perpendicular to the horizontal bottom surface and parallel to the vertical end surfaces of the base member; each of said horizontal and vertical legs being provided with a horizontal face and a vertical face having tapped holes therein for securing a tool to said faces; an aperture extending through said tail portion and communicating with said T-slot; a lock screw slidably mounted in said aperture and being provided with an enlarged head on the lower end thereof which is slidably mounted in the head portion of said T-slot; a pair of spaced apart guide pins fixedly mounted in the head of said screw and extending upwardly therefrom; a pair of spaced apart apertures in the lower surface of said downwardly extended portion of the tail portion; a spring in each of said last mentioned apertures; said guide pins being adapted to be slidably engaged in said last mentioned apertures and abut against the springs therein; a recess in the upper surface of said tail portion surrounding the aperture through the tail portion; a set of swivel washers mounted on the upper end of said lock screw; the lower one of said washers being seated in said recess; and, a lock nut threadably mounted on the upper end of said lock screw.

2. The structure defined in claim 1, wherein: said base member is provided with a recess on each side thereof to provide a finger gripping means; and said bottom and the longer one of said end surfaces on said base member are provided with a plurality of longitudinally extending grooves.

References Cited in the file of this patent

UNITED STATES PATENTS

| | | |
|---|---|---|
| 1,946,432 | Aldeborgh | Feb. 6, 1934 |
| 2,219,180 | Fichter | Oct. 22, 1940 |
| 2,330,412 | Dierking | Sept. 28, 1943 |
| 2,365,436 | Saucier | Dec. 19, 1944 |
| 2,518,080 | Schury | Aug. 8, 1950 |
| 2,705,574 | Schoessow | Apr. 5, 1955 |

FOREIGN PATENTS

| | | |
|---|---|---|
| 239,252 | Switzerland | Jan. 3, 1946 |